US011159551B2

(12) United States Patent
Lewis et al.

(10) Patent No.: US 11,159,551 B2
(45) Date of Patent: Oct. 26, 2021

(54) SENSITIVE DATA DETECTION IN COMMUNICATION DATA

(71) Applicant: Microsoft Technology Licensing, LLC, Redmond, WA (US)

(72) Inventors: Richard P. Lewis, Redmond, WA (US); Arvindnarayanan Ravi, Redmond, WA (US); Daniel L. Mace, Bellevue, WA (US); Jordan Wesley Rogers, Bellevue, WA (US); Manas George, Redmond, WA (US); Wing Kwong Wan, Redmond, WA (US); Yogesh K. Roy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 16/389,557

(22) Filed: Apr. 19, 2019

(65) Prior Publication Data

US 2020/0336501 A1    Oct. 22, 2020

(51) Int. Cl.
*H04L 29/06* (2006.01)
*G06F 16/22* (2019.01)
*G06N 20/00* (2019.01)
*G06F 21/62* (2013.01)

(52) U.S. Cl.
CPC ...... *H04L 63/1425* (2013.01); *G06F 16/2237* (2019.01); *G06F 16/2282* (2019.01); *G06F 21/6263* (2013.01); *G06N 20/00* (2019.01)

(58) Field of Classification Search
CPC . H04L 63/1425; H04L 63/1416; H04L 51/12; G06F 16/2237; G06F 16/2282; G06F 21/6263; G06N 20/00

USPC .......................................................... 726/22
See application file for complete search history.

(56) References Cited

U.S. PATENT DOCUMENTS

| 7,730,540 | B1 * | 6/2010 | Woirhaye | H04L 63/083 726/26 |
| 8,626,714 | B1 * | 1/2014 | Gibson | G06F 16/285 707/640 |
| 8,699,796 | B1 * | 4/2014 | Diao | G06K 9/00865 382/181 |
| 8,752,181 | B2 * | 6/2014 | Grzymala-Busse | G06F 21/6245 726/25 |
| 9,237,006 | B2 * | 1/2016 | Mattsson | G06F 16/2455 |
| 9,773,125 | B2 * | 9/2017 | Mattsson | G06F 16/90335 |
| 10,347,293 | B1 * | 7/2019 | Skinner | G06F 40/30 |

(Continued)

OTHER PUBLICATIONS

"International Search Report and Written Opinion Issued in PCT Application No. PCT/US2020/022392", dated May 4, 2020, 22 Pages.

*Primary Examiner* — Taghi T Arani
*Assistant Examiner* — Badri Narayanan Champakesan
(74) *Attorney, Agent, or Firm* — Newport IP, LLC; Leonard J. Hope

(57) ABSTRACT

The described technologies leverage a trained evaluation function to analyze an email message to determine if a password is included in the text of the email message. The text of the email message may be vectorized using a character lookup table including vector values for each ASCII character. The trained evaluation function analyzes the vectorized text to determine if a password is included in the text of the mail message. An email message found to include a password may be placed in a quarantine storage to at least temporality prevent the email message from being disseminated to a recipient.

16 Claims, 9 Drawing Sheets

(56) References Cited

U.S. PATENT DOCUMENTS

| | | | |
|---|---|---|---|
| 10,354,187 B2* | 7/2019 | Kasravi | G06N 3/084 |
| 2004/0133574 A1* | 7/2004 | Bradford | G06F 21/6254 |
| 2009/0241173 A1* | 9/2009 | Troyansky | H04L 63/1441 |
| | | | 726/5 |
| 2011/0285634 A1* | 11/2011 | Lim | G06F 3/04883 |
| | | | 345/169 |
| 2012/0253787 A1* | 10/2012 | Al-Omari | G06F 40/129 |
| | | | 704/8 |
| 2013/0144602 A1* | 6/2013 | Yeu | G06F 40/194 |
| | | | 704/9 |
| 2013/0212007 A1* | 8/2013 | Mattsson | G06Q 20/382 |
| | | | 705/39 |
| 2015/0005987 A1* | 1/2015 | Khorsheed | G06K 7/1417 |
| | | | 701/2 |
| 2016/0055482 A1* | 2/2016 | Mattsson | G06Q 20/3223 |
| | | | 705/65 |
| 2016/0085971 A1* | 3/2016 | Saxena | G06F 21/602 |
| | | | 726/26 |
| 2016/0092698 A1* | 3/2016 | Mattsson | G06F 16/90335 |
| | | | 726/26 |
| 2016/0253679 A1* | 9/2016 | Venkatraman | G06Q 30/0185 |
| | | | 705/310 |
| 2017/0185799 A1* | 6/2017 | Zheng | G06F 16/9535 |
| 2017/0264640 A1* | 9/2017 | Narayanaswamy | H04L 63/20 |
| 2018/0114142 A1* | 4/2018 | Mueller | G06F 16/906 |
| 2019/0034652 A1* | 1/2019 | Kludy | G06F 21/6245 |
| 2019/0108662 A1* | 4/2019 | Donahue | G06T 3/40 |
| 2019/0385068 A1* | 12/2019 | Takeoka | G06N 5/042 |
| 2020/0019632 A1* | 1/2020 | Larchev | G06F 16/242 |
| 2020/0233857 A1* | 7/2020 | Fehling | G06Q 40/12 |
| 2020/0334603 A1* | 10/2020 | Abdollahnejadbarough | |
| | | | G06K 9/6223 |

* cited by examiner

CHARACTER LOOKUP TABLE 312

| ASCII | Char | is Alpha | Upper | Vowel | Consonant | Numeric | Punctuation | Operator | Special | Shift | Leet | Alpha Order | Numeric Order |
|---|---|---|---|---|---|---|---|---|---|---|---|---|---|
| 32 |   | -1 | -1 | -1 | -1 | -1 | -1 | -1 | -1 | -1 | -1 | -1 | -1 |
| 33 | ! | -1 | -1 | -1 | -1 | -1 | 1 | -1 | -1 | 1 | 1 | -1 | -1 |
| 34 | " | -1 | -1 | -1 | -1 | -1 | 1 | -1 | -1 | 1 | 1 | -1 | -1 |
| 35 | # | -1 | -1 | -1 | -1 | -1 | -1 | -1 | 1 | 1 | 1 | -1 | -1 |
| 36 | $ | -1 | -1 | -1 | -1 | -1 | -1 | -1 | 1 | 1 | 1 | 0.4611 | -1 |
| 37 | % | -1 | -1 | -1 | -1 | -1 | -1 | 1 | -1 | 1 | 1 | -1 | -1 |
| 38 | & | -1 | -1 | -1 | -1 | -1 | -1 | 1 | -1 | 1 | -1 | -1 | -1 |
| 39 | ' | -1 | -1 | -1 | -1 | -1 | 1 | -1 | -1 | -1 | -1 | -1 | -1 |
| 40 | ( | -1 | -1 | -1 | -1 | -1 | 1 | -1 | -1 | 1 | -1 | -1 | -1 |
| 41 | ) | -1 | -1 | -1 | -1 | -1 | 1 | -1 | -1 | 1 | -1 | -1 | -1 |
| 42 | * | -1 | -1 | -1 | -1 | -1 | -1 | 1 | -1 | 1 | -1 | -1 | -1 |
| 43 | + | -1 | -1 | -1 | -1 | -1 | -1 | 1 | -1 | 1 | -1 | -1 | -1 |
| 44 | , | -1 | -1 | -1 | -1 | -1 | 1 | -1 | -1 | -1 | -1 | -1 | -1 |
| 45 | - | -1 | -1 | -1 | -1 | -1 | -1 | 1 | -1 | -1 | -1 | -1 | -1 |
| 46 | . | -1 | -1 | -1 | -1 | -1 | 1 | -1 | -1 | -1 | -1 | -1 | -1 |
| 47 | / | -1 | -1 | -1 | -1 | -1 | -1 | 1 | -1 | -1 | -1 | -1 | -1 |
| 48 | 0 | -1 | -1 | -1 | -1 | 1 | -1 | -1 | -1 | -1 | 1 | 0.1535 | -0.778 |
| 49 | 1 | -1 | -1 | -1 | -1 | 1 | -1 | -1 | -1 | -1 | 1 | -1 | -0.556 |
| 50 | 2 | -1 | -1 | -1 | -1 | 1 | -1 | -1 | -1 | -1 | 1 | -1 | -0.334 |
| 51 | 3 | -1 | -1 | -1 | -1 | 1 | -1 | -1 | -1 | -1 | 1 | -0.6155 | -0.112 |
| 52 | 4 | -1 | -1 | -1 | -1 | 1 | -1 | -1 | -1 | -1 | 1 | -0.9231 | 0.11 |
| 53 | 5 | -1 | -1 | -1 | -1 | 1 | -1 | -1 | -1 | -1 | 1 | -1 | 0.332 |
| 54 | 6 | -1 | -1 | -1 | -1 | 1 | -1 | -1 | -1 | -1 | -1 | -1 | 0.332 |
| 55 | 7 | -1 | -1 | -1 | -1 | 1 | -1 | -1 | -1 | -1 | -1 | 0.538 | 0.554 |

FIG. 5

SENSITIVE DATA DETECTION IN COMMUNICATION DATA

BACKGROUND

Communication and information sharing over the Internet and other networks has become indispensable in current business and social interactions. Since the advent of Internet and the use of other networks, the popularity of electronic messaging, such as email, has grown to a point where it is now widely used for both personal and business communications. Other types of electronic messages, similar to email, are also used in current business and social interactions. Such electronic message types include text messages used to communicate with users of mobile devices, instant messaging used in chat communication sessions, and the like.

Electronic messages may be used to share sensitive data. For example, users may use email to share credentials, such as passwords, that enable access to protected email accounts, operating systems, file directories and so forth.

Electronic message technologies may be easily compromised by bad actors seeking to gain access to information contained in password protected accounts and other services. For example, hackers may compromise a network by embedding a network threat, such as a virus, worm or other malicious code, that performs unauthorized snooping of electronic messages conveyed over the network. The network threat may intercept electronic messages and provide a copy of the electronic messages to an unauthorized recipient, such as a hacker or other criminal. Comprised sensitive data, such as passwords and other credentials, contained in the intercepted messages may be used to gain unauthorized access to valuable business records, such as business secrets and financial information, email accounts, electronic file repositories, and other protected assets.

There remains a technical need to reduce sensitive content shared by users using electronic messaging technologies.

SUMMARY

The technologies described herein address the technical need to provide improved security features over existing systems and technologies by analyzing electronic messaging technologies for sensitive data. For example, at least some of the described technologies analyze an email message for sensitive data, such as a password. The described technologies leverage a trained evaluation function to analyze the email message to determine if a password is included in the text of the email message. An email message found to include a password may be placed in a quarantine storage to prevent the email message from being disseminated to a recipient. In addition, a user interface (UI) may be generated to inform the author of the email message that the email message includes the password. The UI may inform the author that removal of the password will allow dissemination of the email message.

Analysis of an email message for sensitive data may include identifying a plurality of data tokens that include a plurality of characters within the text of the email message. Each of the plurality of data tokens may be converted to a vector list. The vector list may include a plurality of vectors, where each vector represents a character in an associated data token.

The plurality of vectors may be generated using a character lookup table. The character lookup table may include characters that each have vector values that represent features or characteristics associated with the character.

A trained evaluation function may be used to evaluate the vector lists generated from the plurality of data tokens. In some implementations, the trained evaluation function is a recursive machine learning model trained using a data set including known space delimited passwords and a data set including space delimited non-password characters. The trained evaluation function determines when one or more of the plurality of data tokens includes sensitive data, such as a password. The vector lists are leveraged by the trained evaluation function to identify when one or more of the plurality of data tokens includes the sensitive data.

The techniques disclosed herein provide an enhanced level of security by identifying and suppressing the dissemination of sensitive data when it is found in electronic messaging. The techniques disclosed herein can provide a number of technical benefits over existing systems. For example, computing devices that employ the techniques disclosed herein have improved security compared to existing security techniques used by computing devices. Other technical benefits can also be realized from implementations of the technologies disclosed herein.

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithm(s), hardware logic, and/or operation(s) as permitted by the context described above and throughout the document.

BRIEF DESCRIPTION OF THE DRAWING

The detailed description is described with reference to the accompanying figures. In the figures, the left-most digit(s) of a reference number identifies the figure in which the reference number first appears. The same reference numbers in different figures indicate similar or identical items.

FIG. 5 illustrates an exemplary character lookup table that is used in association with the technologies that detect sensitive data associated with electronic messages.

DETAILED DESCRIPTION

Figure 1:
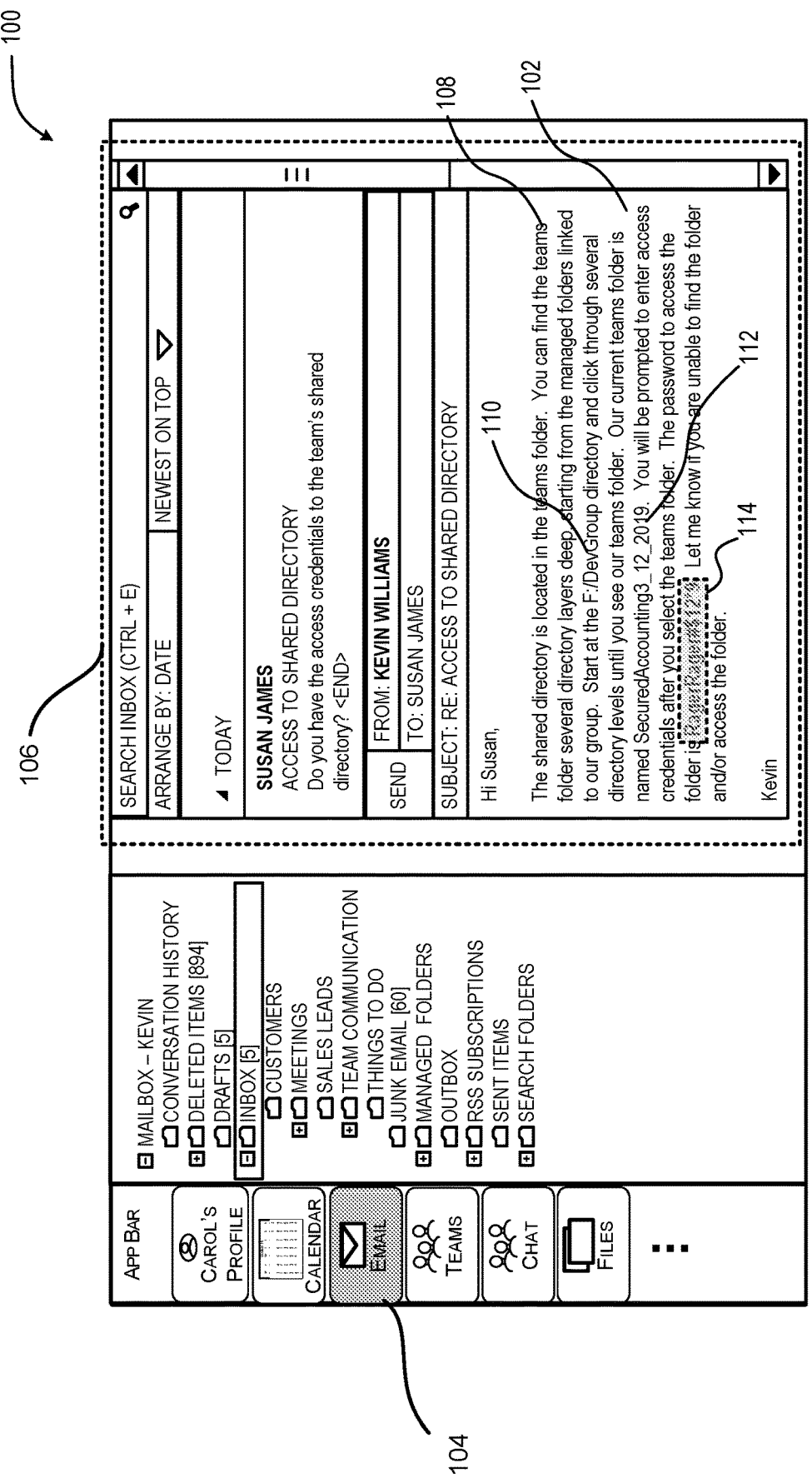
FIG. 1 illustrates an exemplary user interface (UI) used to generate and electronic message for dissemination across a network. Specifically, the UI is linked to an email application.
Figure 3:
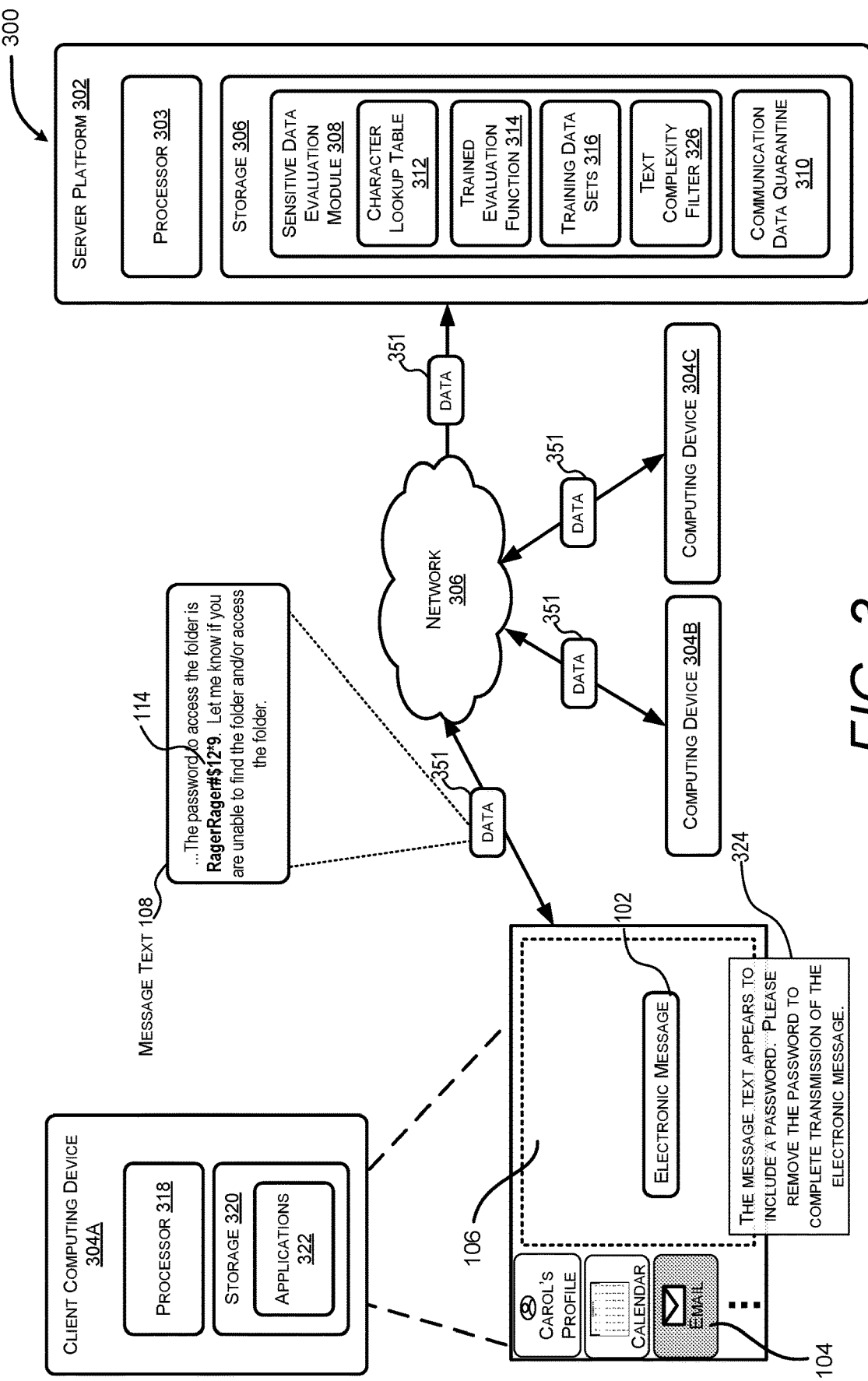
FIG. 3 is a block diagram illustrating an example computing environment that may include computing devices associated with technologies that detect sensitive data associated with electronic messages.

FIG. 1 illustrates an exemplary user interface (UI) 100 used to generate an electronic message 102 for dissemination across a network (not illustrated in FIG. 1). FIG. 3 illustrates a comprehensive environment that may be associated with the technologies disclosed herein.

The UI 100 is linked to an email application 104. However, in other implementations, the UI 100 may be linked to other electronic messaging technologies, such as a chat application, an instant messaging application, a text messaging application (FIG. 2), and so forth.

The UI 100 includes a text input section 106. The text input section 106 offers an interface that allows a user of the UI 100 to input message text 108 for dissemination across the network to a recipient. In the illustrated example, the text input section 106 is part of the email application 104.

The disclosed techniques analyze the input message text 108 for sensitive data. In some implementations, the input message text 108 is analyzed to determine when a password 114 is included in the input message text 108. The disclosed techniques implement a trained evaluation function to analyze the input message text 108.

The trained evaluation function to analyze the input message text 108 may be a recursive machine learning model trained using vectorized characters generated from a character lookup table. The recursive machine learning model may be a recurrent neural network (RNN), a long short-term memory (LSTM), a convolutional neural network (CNN) combined with an RNN or LSTM or a combined RNN/LSTM model.

As will be described in greater detail in the following, analyzing the input message text 108 may include identifying data tokens (e.g., words in the input text 108) that will be analyzed by the trained evaluation function. A text complexity filter may be used to identify the data tokens that will be analyzed by the trained evaluation function.

For example, the text complexity filter may be used to identify data tokens that exceed a text complexity threshold. In particular, the text complexity filter may be programmed to ignore (1) data tokens that have a character length less than a predetermined number of characters (e.g., words less than 8 characters), (2) data tokens that do not have at least one capital letter and at least one special character (e.g., &, *, %, $, @), and/or data tokens that do not have at least one special character (e.g., &, *, %, $, @). Therefore, the text complexity filter may be used to exclude articles, verbs, prepositions, conjunctions, pronouns, adverbs, and other simple words from being processed by the trained evaluation function.

In accordance with the foregoing, the text complexity filter may identify data tokens 110, 112 and 114 that will be analyzed by the trained evaluation function. That is, the text complexity filter may exclude words such as 'the', 'and', 'be' and so forth and allow data tokens 110, 112 and 114 to pass to the trained evaluation function for analysis to determine if the tokens 110, 112 and 114 comprise sensitive data.

The trained evaluation function may receive the data tokens 110, 112 and 114 for analysis to determine if the tokens 110, 112 and 114 include sensitive data. Specifically, the trained evaluation function analyzes vector lists of the data tokens 110, 112 and 114 to ascertain if the tokens 110, 112 and 114 include a password. The vector lists for each of the data tokens 110, 112 and 114 may be generated using the character lookup table.

Analysis by the trained evaluation function reveals that the data token 114 is a password. The determination that the data token 114 is a password causes an associated system to quarantine the electronic message 102. Alternatively, or in addition, the associated system may generate a UI that informs the user that the electronic message 102 may not be sent or transmitted until the data token 114 is removed from the electronic message 102.

Figure 2:
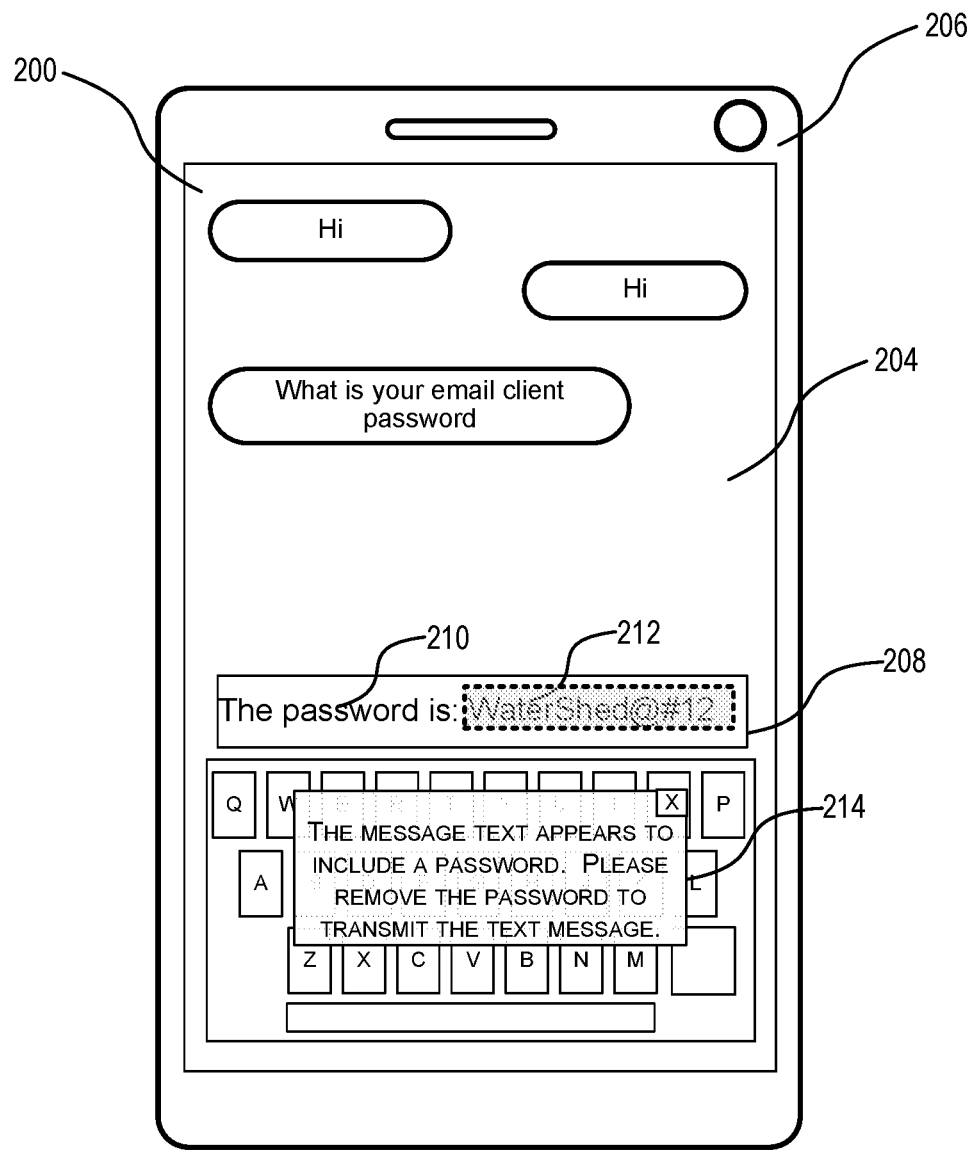
FIG. 2 illustrates another exemplary UI used to generate an electronic message for dissemination across a network. Specifically, the UI is linked to a text messaging application that is running on a mobile device.

FIG. 2 illustrates another exemplary UI 200 used to generate an electronic message 210 for dissemination across a network. Specifically, the UI 200 is linked to a text messaging application 204 that is running on a mobile device 206.

The UI 200 includes a text input section 208. The text input section 208 offers a UI that allows a user of the UI 200 to input the electronic message 210 for dissemination across the network to a recipient.

The disclosed techniques analyze the electronic message 210 for sensitive data. In some implementations, the electronic message 210 is analyzed to determine if a password is included in the electronic message 210. The disclosed techniques implement a trained evaluation function to analyze the electronic message 210. Furthermore, the disclosed techniques may analyze messages that preceded the electronic message 210 for sensitive data and/or context that may be associated with sensitive data.

The trained evaluation function to analyze electronic message 210 may be a recursive machine learning model trained using vectorized characters generated from a character lookup table. The recursive machine learning model may be an RNN, a LSTM, a CNN combined with an RNN or LSTM or a combined RNN/LSTM model.

Analyzing the electronic message 210 may include identifying at least one data token (e.g., words in the electronic message 210) that will be analyzed by the trained evaluation function. A text complexity filter may be used to identify the data token(s) that will be analyzed by the trained evaluation function.

For example, the text complexity filter may be used to identify one or more data tokens that exceed a text complexity threshold. In particular, the text complexity filter may be programmed to ignore (1) data tokens that have a character length less than a predetermined number of characters (e.g., words less than 8 characters), (2) data tokens that do not have at least one capital letter and at least one special character (e.g., &, *, %, $, @), and/or data tokens that do not have at least one special character (e.g., &, *, %, $, @). Therefore, the text complexity filter may be used to exclude articles, verbs, prepositions, conjunctions, pronouns, adverbs, and other simple words from being processed by the trained evaluation function.

In accordance with the foregoing, the text complexity filter may identify a data token 212 that will be analyzed by the trained evaluation function. That is, the text complexity filter may exclude words such as 'the', 'and', 'be' and so forth and allow the data token 212 to pass to the trained evaluation function for analysis to determine if the token 212 comprises sensitive data.

The trained evaluation function may receive the data token 212 for analysis to determine if the data token 212 includes sensitive data. Specifically, the trained evaluation function analyzes a vector list of the data token 212 to ascertain if the data token 212 includes a password. The vector list for data token 212 may be generated using the character lookup table.

Analysis by the trained evaluation function reveals that the data token 212 is a password. The determination that the data token 212 is a password causes an associated system to quarantine the electronic message 210. Alternatively, or in addition, the associated system may generate a UI 214 that informs the user that the electronic message 210 may not be sent or transmitted over the network until the data token 212 is removed from the electronic message 210.

FIG. 3 illustrates an example system 300 that is suitable for implementing the technologies described herein. The system includes a number of devices 304A-304C and at least one server platform 302. The server platform 302 and devices 304A-304C can exchange communication data 351, such as the electronic message 102, with one another via a network 306. The communication data 351 can include some or all of the message text 108 that is associated with the electronic message 102. The server platform 302 and devices 304A-304C can exchange other types of data with one another via a network 306.

The other types of data may be considered as communication data 351. For example, communication data 351 may be included in a document or documents that are shared among a plurality of users. For example, the communication data 351 may be in a document, such as a word processing document, that is available for viewing, editing, and so forth, by a plurality of users that have access rights to the document. Such a document may be associated with SharePoint, or the like, for example. Other shared documents and communication data 351 therein that may be analyzed by the described implementations include a presentation document, a facsimile, a spreadsheet, portable document format (e.g., PDF) data, a web page, and so forth.

The described implementations may analyze the communication data 351 in the document in the same manner described herein with reference FIGS. 1-9. For example, a document found to include sensitive data may be placed in quarantine, such as quarantine 310 illustrated in FIG. 3. In addition, or alternatively, the described implementations may present a UI that informs an author or editor of the document that sensitive data was identified in the document. Read and editing access to the document may be curtailed or suspended until the sensitive data is removed from the document, or when an administrator releases the access suspension.

While the following description often refers to a single computing device 304, it is to be understood that each of the computing devices 304A-304C may include each of the functional elements described in relation to the single computing device 304 referenced in the following.

The network 306 can be a variety of different networks, including the Internet, a local area network (LAN), a wide area network (WAN), a personal area network, a cellular or other phone network, an Intranet, other public and/or proprietary networks, combinations thereof, and so forth. It should be noted that the network 306 can be configured to include multiple networks.

The devices 304 can be a variety of different types of devices. For example, in the system 300 each of the devices 304 may be one of a laptop or netbook computer device, a cellular or other wireless phone (e.g., a smartphone) device, a tablet or notepad computer, a printer, a desktop computer, a television or any other suitable computing device.

The server platform 302 (which might be referred to simply as "the platform 302") provides one or more services that can be accessed by the devices 304 via the network 306. The server platform 302 is implemented using one or more of a variety of different types of devices, including a server, a pool of networked servers, a server farm, or any other suitable distributed or co-located server computers.

The server platform 302 may include a processor 303 and a storage 306. The storage 306 may include one or more modules for storing computer executable instructions. The computer executable instructions may be associated with an application, such as an OS and/or one or more end user programs. The processor 303 may execute the computer executable instructions to implement the techniques disclosed herein.

The modules associated with the storage 306 may include a sensitive data evaluation module 308. Furthermore, the storage 306 may include a communication data quarantine 310. The server platform 302 may use the data quarantine 310 to store communication data 351 that is determined to include sensitive data, such as one or more passwords.

The sensitive data evaluation module 308 may analyze communication data 351 to determine if the communication data 351 includes sensitive data, such as passwords included in the message text 108 of the electronic message 102. For example, the sensitive data evaluation module 308 analyzes communication data 351 received from one or more of the computing devices 304. The communication data 351 received from the one or more of the computing devices 304 may be in the form of text messages, email, or any other communication data 351 that includes text.

The communication data 351 received by the server platform 302 may be for transmission to one or more of the computing devices 304. In some implementations, the server platform 302 functions to receive communication data 351 before it is forwarded to a recipient or user of a destination computing device 304. Therefore, the server platform 302 is capable of intercepting and analyzing communication data 351 for sensitive data before it is disseminated to a recipient associated with a destination computing device 304.

The sensitive data evaluation module 308 may include a character lookup table 312, a trained evaluation function 314, and training datasets 316. The sensitive data evaluation module 308 leverages the character lookup table 312 and the trained evaluation function 314 when analyzing the communication data 351 for sensitive data. The training datasets 316 may include a first set of data comprising a plurality of known passwords and a second set of data comprising a plurality of known non-passwords. The training datasets 316 are processed by an RNN or the like to establish the trained evaluation function 314. The training datasets 316 are illustrated in greater detail in FIG. 4.

The character lookup table 312 may comprise a plurality of ASCII characters such as ASCII characters 32-255. Each of the ASCII characters is characterized within the character lookup table 312 with associated vector values linked to predefined character attributes. Those predefined character attributes may include attributes that indicate a category (e.g., letter, numeric, uppercase, vowel, punctuation, and special, location on keyboard) of an ASCII character. An exemplary version of the character lookup table 312 is illustrated in FIG. 5. The character lookup table 312 may include other characters when the text being analyzed for sensitive data is in a language other than English.

The character lookup table 312 may be used by the server platform 302 to convert one or more characters to a vector representation. For example, each character of a character set (e.g., a data token) may be converted to a vector representation by referencing the character lookup table 312.

Therefore, using the character lookup table 312, the server platform 302 may convert one or more data tokens, such as the data token 114, to a list of vectors, where each vector in the list represents a character in the one or more data tokens.

The computing device 304 may include a processor 318 and a storage 320. Furthermore, the storage 320 may include a plurality of modules. The modules may be implemented as computer executable instructions. The computer executable instructions may be associated with an application, such as the OS and/or an end user program. The processor 318 may execute the computer executable instructions associated with the storage 320 to enable functionalities associated with the computer executable instructions. Furthermore, the devices 304 may include a display screen to display one or more UIs.

The storage 320 may include one or more applications 322. One or more of the applications 322 may be executed the processor 318 to display and enable functionalities of the one or more applications 322. As illustrated in FIG. 3, one of the applications 322 is the email application 104 that a user may use to generate the electronic message 102. The electronic message 102 may include the message text 108 and sensitive data, such as the data token 114 comprising a password.

A user of the email application 104 may draft the electronic message 102 for communication to one or more users of the computing devices 304. Prior to delivering the electronic message 102 to one or more of the computing device 304, the server platform 302 analyzes the message text 108 for sensitive data, such as one or more passwords. The sensitive data evaluation module 308 performs the analysis of the message text 108 for sensitive data.

The communication data 351 received by the server platform 302 may include the message text 108. The sensitive data evaluation module 308 receives the message text 108 and analyzes the message text 108 to identify data tokens (e.g., words in the message text 108) to be analyzed by the trained evaluation function 314. For example, a text complexity filter 326 of the sensitive data evaluation module 308 may be used to identify data tokens that exceed a text complexity threshold. In particular, the text complexity filter 326 may be programmed to ignore (1) data tokens that have a character length less than a predetermined number of characters (e.g., words less than 8 characters), (2) data tokens that do not have at least one capital letter and at least one special character (e.g., &, *, %, $, @), and/or data tokens that do not have at least one special character (e.g., &, *, %, $, @). Therefore, the text complexity filter 326 may be used to exclude articles, verbs, prepositions, conjunctions, pronouns, adverbs, and other simple words from being processed by the trained evaluation function 314.

In accordance with the foregoing, the text complexity filter 326 may identify data tokens 110, 112 and 114 that will be analyzed by the trained evaluation function 314. That is, the text complexity filter 326 may exclude words such as 'the', 'and', 'be' and so forth and allow data tokens 110, 112 and 114 to pass to the trained evaluation function 314 for analysis to determine if the tokens 110, 112 and 114 comprise sensitive data.

The trained evaluation function 314 may receive the data tokens 110, 112 and 114 for analysis to determine if the tokens 110, 112 and 114 include sensitive data. Specifically, the trained evaluation function 314 analyzes vector lists of the data tokens 110, 112 and 114 to ascertain if the tokens 110, 112 and 114 include a password. The vector lists for each of the data tokens 110, 112 and 114 may be generated using the character lookup table 312.

Analysis by the trained evaluation function 314 reveals that the data token 114 is a password. The determination that the data token 114 is a password causes the server platform 302 to quarantine the electronic message 102 in the communication data quarantine 310. More specifically, the server platform 302 quarantines the electronic message 102 to prevent transmission thereof to a recipient associated with at least one of the computing devices 304. Alternatively, or in addition, the server platform 302 may generate and communicate the text shown in a UI 324, which is to inform a user of the email application 104 that sensitive data was found in the message text 108. The text shown in the UI 324 may be communicated as a data packet (e.g., communication data 351) to the client computing device 304 that was used to generate the electronic message 102. The UI 324 may be generated by the email application 104.

The server platform 302 may perform an additional analysis process associated with the message text 108, subsequent to the determination that the data token 114 is a password and prior to (1) quarantining the message text 108 in the communication data quarantine 310 and/or (2) generating the text for inclusion in the UI 324.

The additional analysis process involves ascertaining a context (e.g., meaning, subject, topic, perspective, background) of a predetermined number of words that precede and/or follow the data token 114. The additional analysis may be performed by the sensitive data evaluation module 308. The additional analysis may increase the confidence level that the data token 114, identified as a password by the sensitive data evaluation module 308, was properly identified as being a password.

In some implementations, the additional analysis performed by the sensitive data evaluation module 308 involves identifying one or more sets of 300 characters or less that precede and/or follow the data token 114. The number of characters in the one or more sets of characters may be larger than 300 characters depending on a desired level of accuracy associated with determining the context the text surrounding the data token 114. Furthermore, some or all of the communication data 351 may analyzed using the one or more sets of characters. The sensitive data evaluation module 308 may analyze the one or more sets of characters for keywords or phrases (e.g., here is my password, password, to gain access, etc.) that are often use in connection with the sharing of sensitive data to establish a context in the message text 108. The keywords or phrases may be part of a lookup table stored by the server platform 302.

In some implementations, the sets of 300 characters or less are vectorized and processed by a trained evaluation function, similar to the trained evaluation function 314, to ascertain the context associated with the sets of 300 characters or less.

In some implementations, the trained evaluation function 314 functions to evaluate for data tokens that contain sensitive data and in addition functions to evaluate the context of the text (e.g., 300 characters before and/or after data tokens found to include sensitive data) that is in the vicinity of data tokens determined to include sensitive data. Therefore, the trained evaluation function 314 may include a plurality of evaluation paths. One of the evaluation paths of the trained evaluation function 314 evaluates vectorized data tokens for sensitive data. Another of the evaluation paths evaluates vectorized text in the vicinity of data tokens determined to include sensitive data to ascertain when a context of the vectorized text in the vicinity of the data tokens supports the determination that one or more of the data tokens includes sensitive data.

In other implementations, two separate trained evaluation functions are used by the described implementations. For example, a trained evaluation function may evaluate the communication data 351 for data tokens that include sensitive data and another trained evaluation function may evaluate a context of the communication data 351 to further strengthen a determination that one or more data tokens of the communication data 351 comprise sensitive data.

When the sensitive data evaluation module 308 finds that the context of the message text 108 supports the determination that the data token 114 is a password, the server platform 302 quarantines the message text 108 in the communication data quarantine 310 and/or generates the text for inclusion in the UI 324.

The trained evaluation function (e.g., the trained evaluation function 314) for determining context of the communication data 351 may have been trained using vector lists generated by an embedding algorithm, such as Word2vec. Word2vec is a known neural net that processes text. The input to Word2vec is a text corpus and its output is a set of vectors, specifically, feature vectors for words in the text corpus. The text corpus used by at least some of the implementations described herein includes sets of communication data, such as emails, in which it is known that a password occurs. Furthermore, the text corpus includes sets of communication data, such as emails, in which it is known that a password does not occur. The feature vectors for words in the text corpus or input to a machine learning model, such as an RNN, a LSTM, a CNN combined with an RNN or LSTM or a combined RNN/LSTM model to generate the trained evaluation function used for determining the context associated with the communication data 351.

In some implementations, the computing device 304 provides the functionalities described in relation to the server platform 302. For example, the computing device 304 may include the sensitive evaluation module 308 and its associated elements and the communication data quarantine 310.

Figure 4:
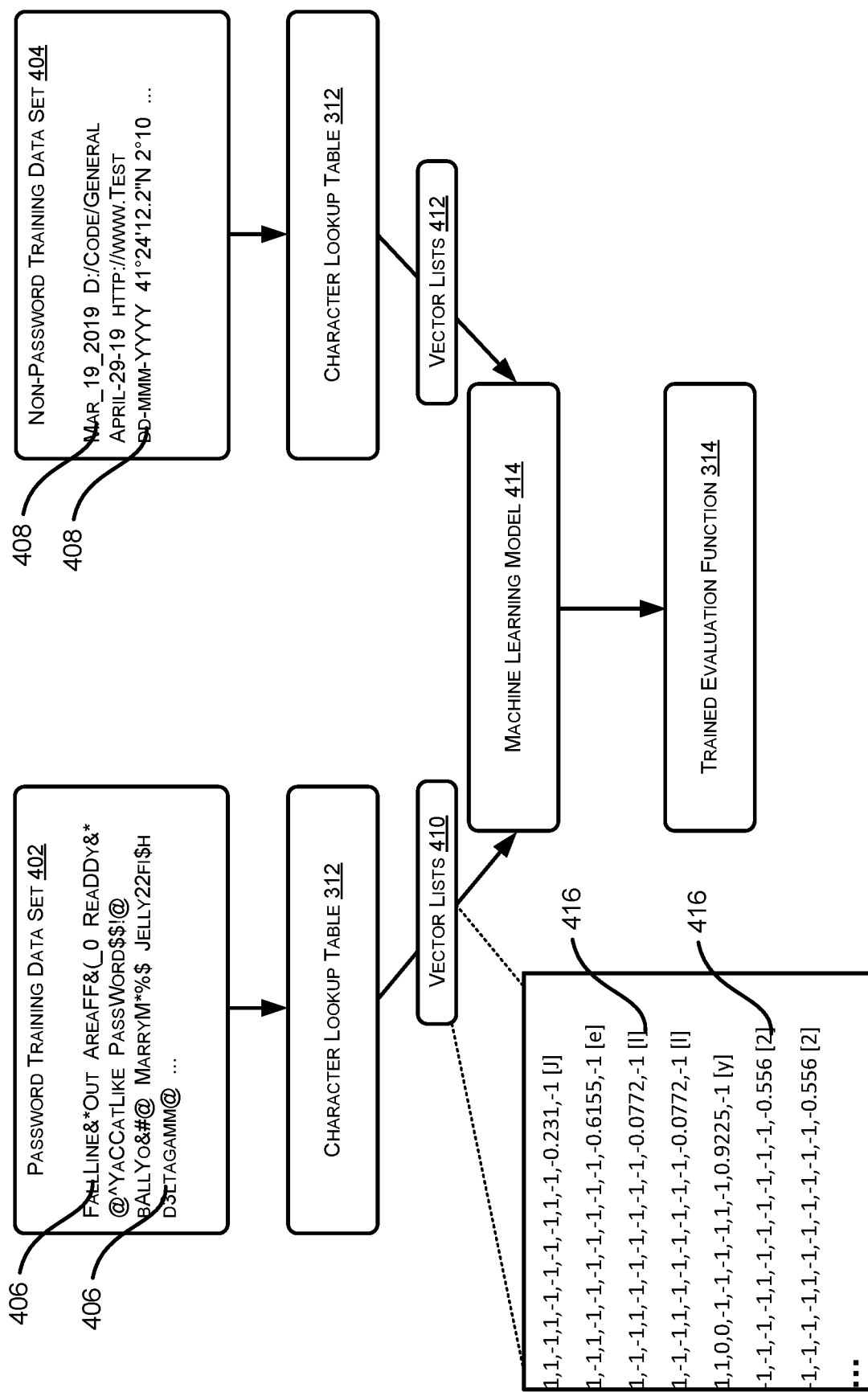
FIG. 4 illustrates a block diagram showing the use of training data sets, a character lookup table, and a machine learning model to generate a trained evaluation function that is used to identify sensitive data in one or more data tokens.

FIG. 4 illustrates a block diagram showing the use of training data sets 402 and 404, the character lookup table 312, and a machine learning model 414 to generate the trained evaluation function 314 that is used to identify sensitive data in one or more data tokens.

The process of generating the trained evaluation function 314 involves establishing a password training data set 402 and a non-password training data set 404. The password training data set 402 includes a plurality of known passwords 406. Any number of known passwords 406 may be included in the password training data set 402. The use of a large corpus (e.g., in the thousands) of known passwords 406 may result in the generation of a robust trained evaluation function 314. The non-password training data set 404 includes a plurality of known non-passwords 408. The known non-passwords 408 have characteristics (e.g., include special characters, capital letters, etc.) that make them appear as actual passwords. The use of a large corpus (e.g., in the thousands) of known non-passwords 408 may result in the generation of a robust trained evaluation function 314.

The data associated with each of the data sets 402 and 404 are passed to the character lookup table 312. The character lookup table 312 is illustrated in greater detail in FIG. 5. Vector lists 410 and 412 are generated from the data associated with each of the data sets 402 and 404, using the character lookup table 312. The vector lists 410 each correspond to a password of the password training data set 402. For example, the password 'FallLine&*Out' will have a corresponding vector list that comprises 13 vectors, where each vector in the vector list corresponds to a letter in the password 'FallLine&*Out'. Similarly, the vector lists 412 each correspond to a non-password of the non-password training data set 404. For example, the non-password 'D:/Code/General' will have a corresponding vector list that comprises 15 vectors, where each vector in the vector list 412 corresponds to a letter in the non-password 'D:/Code/General'.

Part of the vector list for 'Jelly22fi$h' is illustrated in FIG. 4, through the second '2' in the password. The vector list for 'Jelly22fi$h' may be generated using the character lookup table 312 that includes the ASCII characters 32-255, where each of the ASCII characters 32-255 has associated vector values indicating ASCII character characteristics or features. The letters and numbers 416 are provided for illustration purposes only. That is, the vectors of the vector lists 410 and 412 are received by the machine learning model 414; the letters and numbers 416 would not be fed to the model 414.

Each vector in the vector list may include a greater number of vector values or a fewer number of vector values than illustrated in FIG. 4. That is, the character lookup table 312 may arranged to reference any number of characteristics or features. In some implementations, each of the ASCII characters 32-255 in the character lookup table 312 includes a vector value for the following referenced characteristic or feature (refer to FIG. 5; col. 0 in the following follows the 'Char' col. shown in FIG. 5): col. 0 is alphabet letter; col. 1 is uppercase; col. 2 is vowel; col. 3 is consonant; col. 4 is numeric; col. 5 is punctuation; col. 6 is operator; col. 7 is special character (e.g., #, \, ]); col. 8 is keyboard shift needed; col. 9 is leet (@=a, $=s or S, etc.); col. 10 is alphabetic sequential order; col. 11 is numeric order; col. 12 is keyboard row; col. 13 is keyboard column; col. 14 is grouping or parenthetical character (1=begin grouping, 2=end grouping, 1.5=symmetric for begin or end grouping); col. 15 ASCII sequence; col. 16-20 ID vector (together with cols. 2-7, 9, 11, and 14 creates a unique ID for each character). However, cols. 16-20 by themselves will match for similar chars, for example, A, a, 4, and @ all share the same ID 11111. The unique ID for each character is used during the training process of the machine learning module 414 to distinguish each of the vectors input to the module 414.

The vector lists 410 and 412 are passed to a machine learning model 414. As discussed previously, the machine learning model 414 may be an RNN, a LSTM, a CNN combined with an RNN or LSTM or a combined RNN/LSTM model. The vector lists 410 and 412 are passed of the machine learning model 414 as part of the training process to generate the trained evaluation function 414. The vector lists 410 and 412 may be passed to the machine learning model 414 using the Microsoft Cognitive Toolkit (CNTK). Alternate machine learning toolkits may be used to pass the vector lists 410 and 412 to the machine learning model 414. Training of the machine learning model 414 results in the generation of the trained evaluation function 314. As discussed herein, the trained evaluation function 314 is functional to analyze data tokens, in converted vector list format, for the presence of sensitive data such as passwords.

FIG. 5 illustrates a portion of the character lookup table 312 that is used to generate vector lists from one or more data tokens. While ASCII characters 32-55 are illustrated in FIG. 5, it is to be understood that the character lookup table 312 includes the ASCII characters 32-255, where each of the ASCII characters 32-255 has associated vector values indicating ASCII character characteristics.

Each character 502 in the character lookup table 312 includes corresponding vector values (e.g., −1, 1, decimal values, etc.) identifying if the character 502 has a corresponding characteristic 504 The characteristics 504 shown in FIG. 5 include, to name a few, 'is the character uppercase', 'is a character a vowel', 'is a character a constant', 'is the character numeric', 'is the character punctuation', 'is the character an operator', 'is the character a special character', 'is the character leet' (e.g., $=s, @=a, etc.), and so forth. A vector value of −1 indicates that a given character does not possess a particular characteristic, a vector value of 1 indicates that a given character does possess a particular characteristic, and a vector value in the form of a decimal (e.g., 0.1535) indicates a given character may be likely or less likely to possess a particular characteristic.

Consider the exemplary data token: 1!%. The corresponding vector list, generated using the character lookup table 312, would include the vectors: <−1, −1, −1, −1, 1, −1, −1, −1, −1, −1, −1, −0.778>, <−1, −1, −1, −1, −1, −1, −1, 1, −1, −1, −1, −1>, and <−1, −1, −1, −1, −1, −1, 1, 1, 1, −1, −1, −1>. The vectors may be larger or smaller based on the number of characteristics associated with each ASCII character in the character lookup table 312. Any data token, such as data tokens associated with the data training sets 402 and 404 and data tokens associated with communication data 315, may be converted to a vectorized representation comprising one or more of vectors in a vector list using the character lookup table 312.

Figure 6:
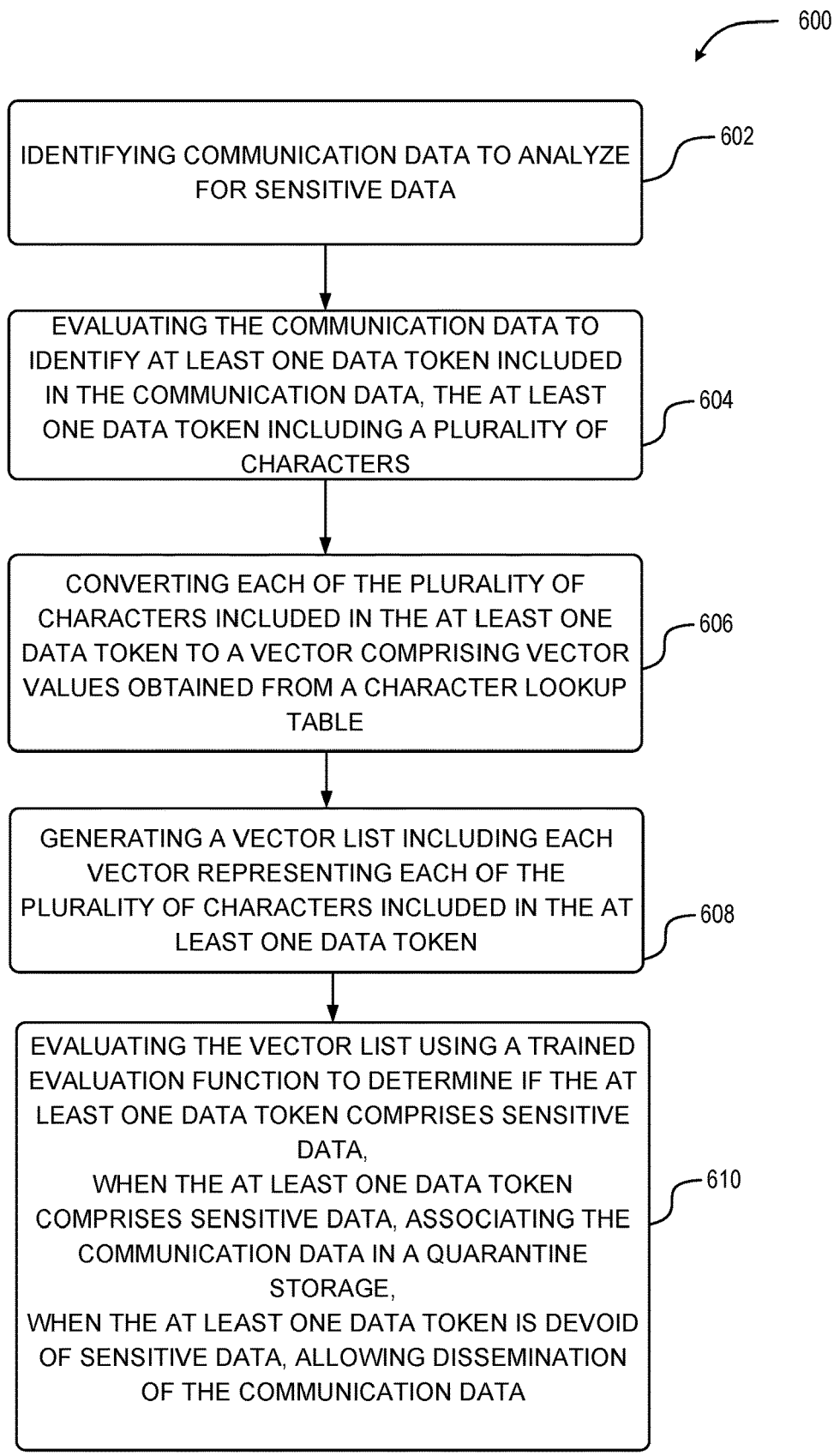
FIG. 6 illustrates a flow chart diagram relating to operations associated with detecting sensitive data in electronic messages.

FIG. 6 is a diagram of an example flowchart 600 that illustrates operations associated with identification of sensitive content associated with communication data. In some implementations, the operations of FIG. 6 can be performed by components of one or more computing devices, such one or more of the devices 304 and/or the server platform 302. Therefore, the instructions associated with the example flowchart 600 may be executed by one or more processors associated with server-side components (e.g., the server platform 302) and/or client-side components (one or more of the devices 304).

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., the device(s) 304 and/or, the server platform 302) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Furthermore, the logical operations described herein may be implemented by a single computing device, such as a client device or a server device. Alternatively, the logical operations described herein may be implemented by a combination of server devices and client devices.

The flowchart 600 may begin at operation 602, where communication data is identified to analyze for sensitive data. For example, the server platform 302 or other computing device may identify the message text 108 to analyze for sensitive data, such as passwords.

At operation 604, the communication data is evaluated to identify at least one data token, where the at least one data token includes a plurality of characters. For example, the server platform 302 may filter the message text 108 to identify the at least one data token that includes the plurality characters. The text complexity filter 326 may be used to filter the message text 108. The text complexity filter 326 eliminates data tokens (e.g., words) that are not sufficiently complex to be considered sensitive data, such as a password.

At operation 606, each of the plurality of characters included in the at least one data token is converted to a vector comprising vector values obtained from a character lookup table. For example, the sensitive data evaluation module 308 may use the character lookup table 312 to convert each of the plurality of characters included in the at least one data token to a vector comprising vector values obtained from the character lookup table 312. The character lookup table 312 includes ASCII characters, where each of the ASCII characters includes one or more vector values associated with a characteristic of the ASCII characters.

At operation 608, a vector list including each vector representing each of the plurality of characters included in the at least one data token is generated. For example, the vector list may be generated by the sensitive data evaluation module 308.

At operation 610, the vector list is evaluated using a trained evaluation function to determine if the at least one data token comprises sensitive data, such as a password. When the at least one data token comprises sensitive data, the communication data is associated in a quarantine storage. However, when the at least one of the data token is devoid of sensitive data, the communication data is disseminated to at least one recipient identified in the communication data. For example, the vector list may be evaluated by the trained evaluation function 314.

In some implementations, one or more of the operations 602-610 are performed as a computer background process that is insulated or hidden from a user. Specifically, the operations 602-610 may be performed autonomously by an operating system, such as the MICROSOFT WINDOWS operating system, software application, and so forth.

Figure 7:
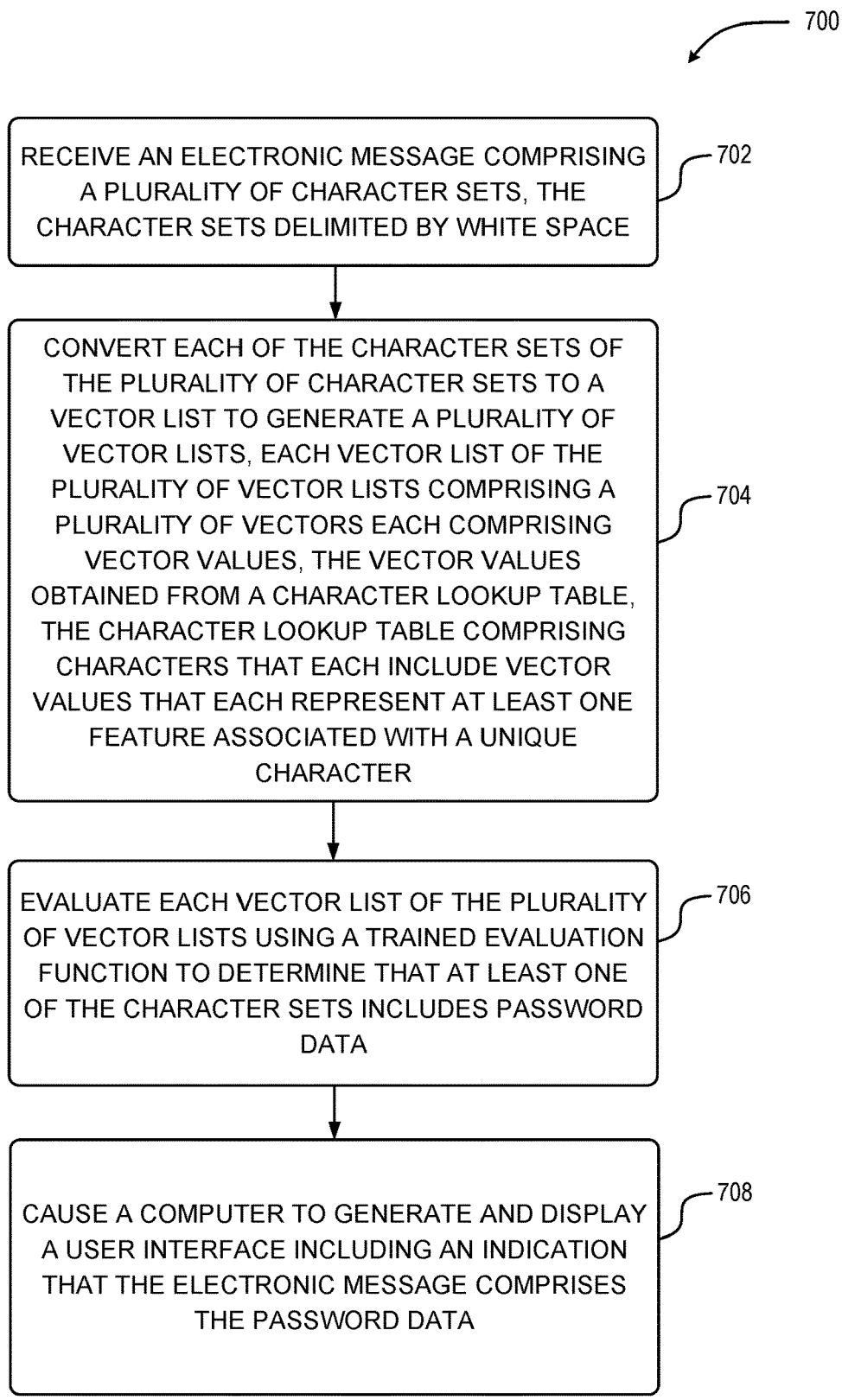
FIG. 7 illustrates a flow chart diagram relating to operations associated with detecting sensitive data in electronic messages.

FIG. 7 is a diagram of an example flowchart 700 that illustrates operations associated with identification of sensitive content associated with communication data. In some implementations, the operations of FIG. 7 can be performed by components of one or more computing devices, such one or more of the devices 304 and/or the server platform 302. Therefore, the instructions associated with the example flowchart 700 may be executed by one or more processors associated with server-side components (e.g., the server platform 302) and/or client-side components (one or more of the devices 304).

The flowchart 700 may begin at operation 702, where an electronic message comprising a plurality of character sets is received. The plurality of character sets may be delimited by white space. In some implementations, the electronic message includes a plurality words or data tokens that are separated by spaces (e.g., white space). The electronic message may be received by the server platform 302. The server platform 302 is to disseminate the electronic message to a recipient identified within the electronic message. In some implementations, the electronic message is an email, text message, or the like.

At operation 704, each of the character sets of the plurality of character sets is converted to a vector list to generate a plurality of vector lists. Each vector list of the plurality of vector lists comprises a plurality of vectors each comprising vector values. The vector values may be obtained from a character lookup table that comprises characters that each include vector values that represent at least one feature or characteristic associated with a unique character. In some implementations, the character lookup table 312 is used to generate the plurality of vector lists. The sensitive data evaluation module 308 leverages the character lookup table 312 to generate the plurality of vector lists.

At operation 706, each vector list of the plurality of vector lists is evaluated using a trained evaluation function to determine that at least one of the character sets includes password data. In some implementations, the trained evaluation function 314 determines that at least one of the character sets includes the password data.

At operation 708, a computer is caused to generate and display a user interface including an indication that the electronic message comprises the password data. For example, the server platform 302 may cause the client computing device 304 to generate the UI 324 by communicating to the client computing device 304 a notification that the electronic message comprises the password data.

In some implementations, one or more of the operations 702-708 are performed as a computer background process that is insulated or hidden from a user. Specifically, the operations 702-708 may be performed autonomously by an operating system, such as the MICROSOFT WINDOWS operating system, software application, and so forth.

Figure 8:
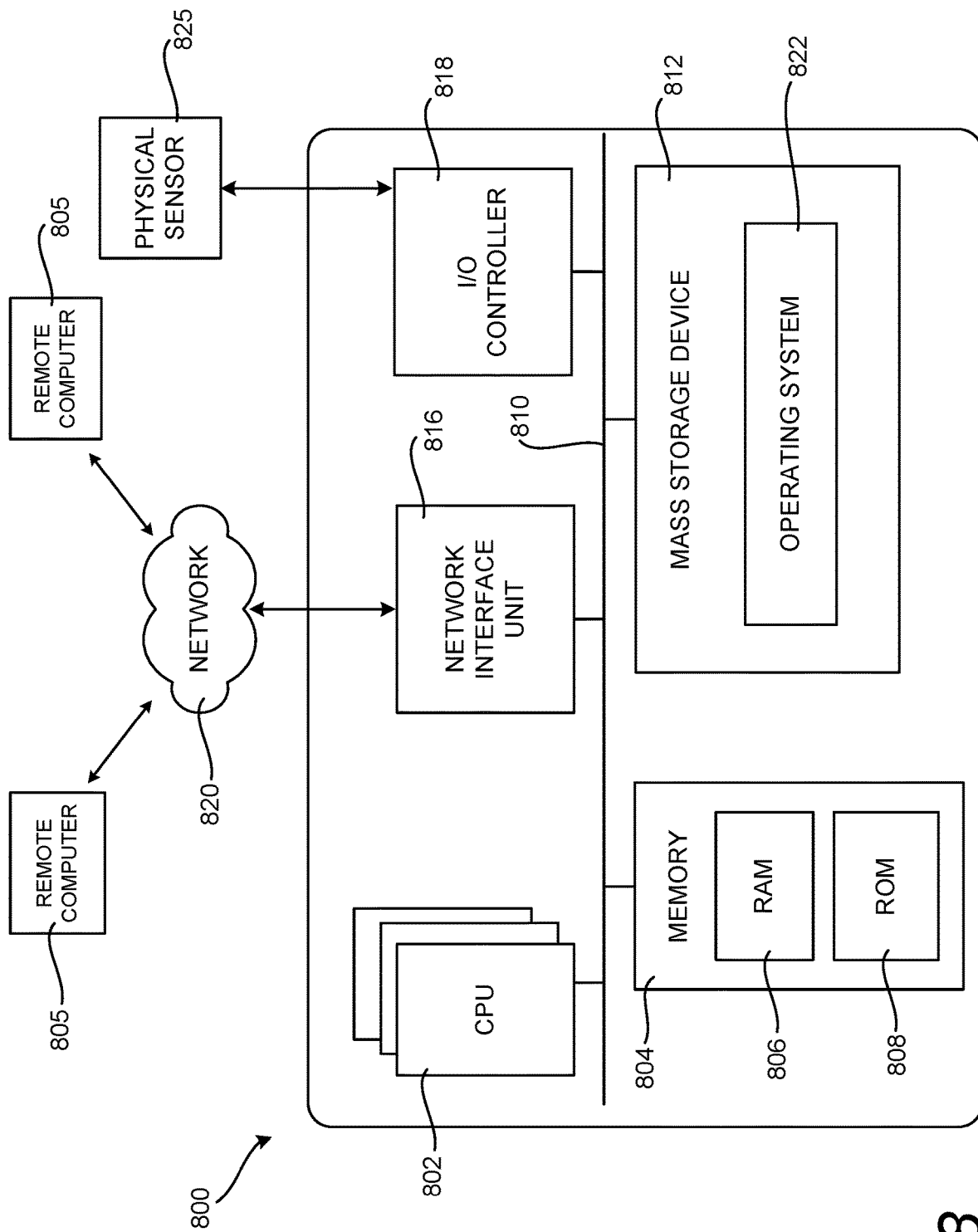
FIG. 8 is a computer architecture diagram showing an illustrative computer hardware and software architecture for a computing device that can implement aspects of the technologies presented herein.

FIG. 8 is a computer architecture diagram showing an illustrative computer hardware and software architecture for a computing device 800 that can implement the various technologies presented herein. In particular, the architecture illustrated in FIG. 8 can be utilized to implement a server computer, mobile phone, an e-reader, a smartphone, a desktop computer, an AR/VR device, a tablet computer, a laptop computer, or another type of computing device. In some implementations, the devices 304 and the server platform 302 implement some or all of the elements and functionalities associated with the computing device 800.

The computer 800 illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system ("BIOS" or "firmware") containing the basic routines that help to transfer information between elements within the computer 800, such as during startup, can be stored in the ROM 808. The computer 800 further includes a mass storage device 812 for storing an operating system 822, application programs, and other types of programs. The mass storage device 812 can also be configured to store other types of programs and data.

The mass storage device 812 is connected to the CPU 802 through a mass storage controller (not shown on FIG. 8) connected to the bus 810. The mass storage device 812 and its associated computer readable media provide non-volatile storage for the computer 800. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), BLU-RAY, or other optical storage, magnetic cassettes, magnetic tape, magnetic disk storage or other magnetic storage devices, or any other medium that can be used to store the desired information and which can be accessed by the computer 800. For purposes of the claims, the phrase "computer storage medium," and variations thereof, does not include waves or signals per se or communication media.

According to various configurations, the computer 800 can operate in a networked environment using logical connections to remote computers through a network such as the network 820. In some implementations, the network 306 provides at least some or all of the same functionalities as the network 820. The computer 800 can connect to the network 820 through a network interface unit 816 connected to the bus 810. It should be appreciated that the network interface unit 816 can also be utilized to connect to other types of networks and remote computer systems. The computer 800 can also include an input/output controller 818 for receiving and processing input from a number of other devices, including a keyboard, mouse, touch input, an electronic stylus (not shown in FIG. 8), or a physical sensor such as a video camera. Similarly, the input/output controller 818 can provide output to a display screen or other type of output device (also not shown in FIG. 8).

It should be appreciated that the software components described herein, when loaded into the CPU 802 and executed, can transform the CPU 802 and the overall computer 800 from a general-purpose computing device into a special-purpose computing device customized to facilitate the functionality presented herein. The CPU 802 can be constructed from any number of transistors or other discrete circuit elements, which can individually or collectively assume any number of states. More specifically, the CPU 802 can operate as a finite-state machine, in response to executable instructions contained within the software modules disclosed herein. These computer-executable instructions can transform the CPU 802 by specifying how the CPU 802 transitions between states, thereby transforming the transistors or other discrete hardware elements constituting the CPU 802.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the architecture shown in FIG. 8 for the computer 800, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 800 might not include all of the components shown in FIG. 8, can include other components that are not explicitly shown in FIG. 8, or can utilize an architecture completely different than that shown in FIG. 8.

Figure 9:
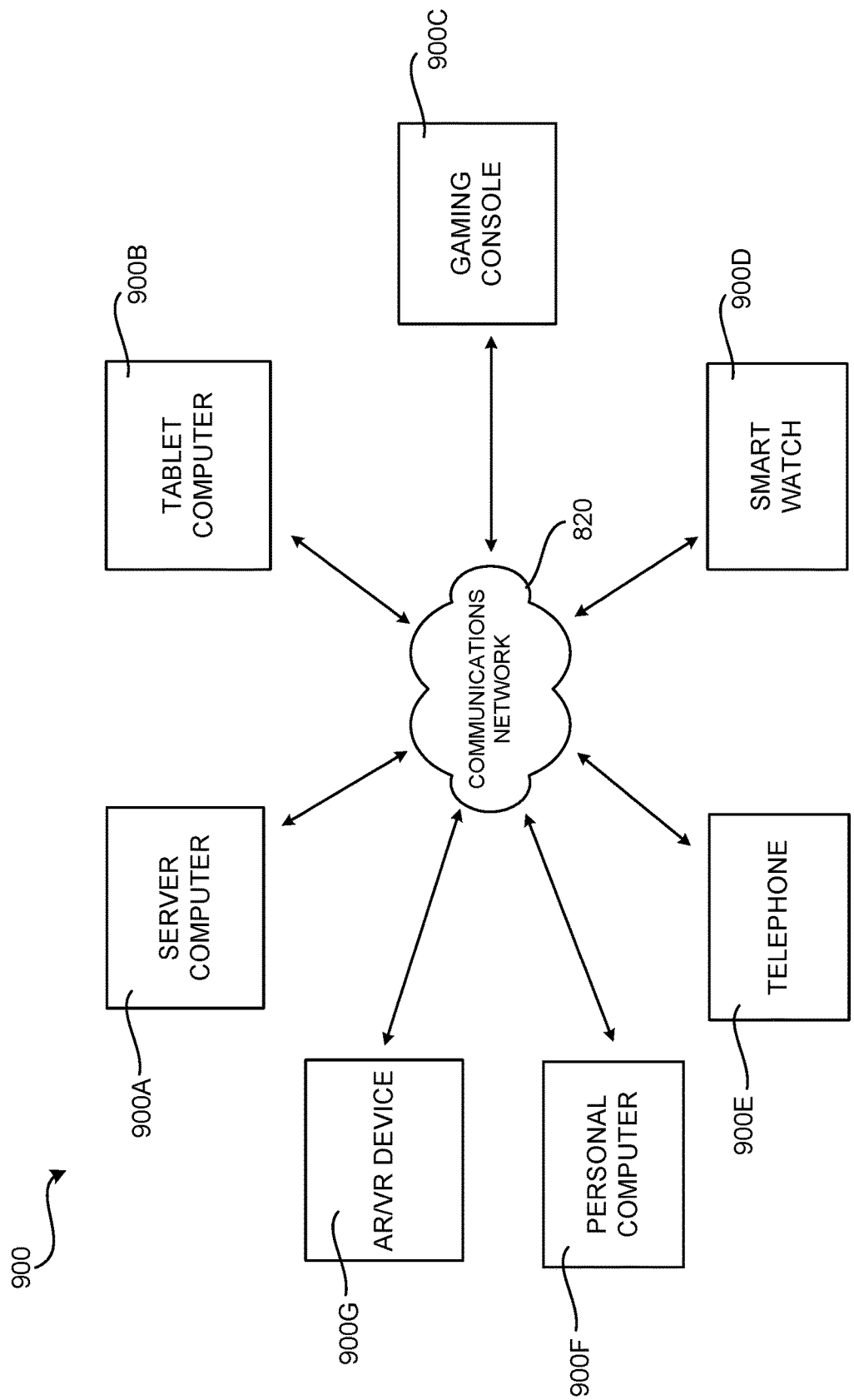
FIG. 9 is a network diagram illustrating a distributed computing environment in which aspects of the disclosed technologies can be implemented.

FIG. 9 is a network diagram illustrating a distributed network computing environment 900 in which aspects of the disclosed technologies can be implemented, according to various embodiments presented herein. The server platform provider 302 may implement the distributed network computing environment 900 to provide distributed storage, via one or more distributed physical or virtual storages associated with one or more computing devices.

As shown in FIG. 9, one or more server computers 900A can be interconnected via a communications network 820 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of devices such as, but not limited to, a tablet computer 900B, a gaming console 900C, a smart watch 900D, a telephone 900E, such as a smartphone, a personal computer 900F, and an AR/VR device 900G.

In a network environment in which the communications network 820 is the Internet, for example, the server computer 900A can be a dedicated server computer operable to process and communicate data to and from the devices 900B-900G via any of a number of known protocols, such as, hypertext transfer protocol ("HTTP"), file transfer protocol ("FTP"), or simple object access protocol ("SOAP"). Additionally, the networked computing environment 900 can utilize various data security protocols such as secured socket layer ("SSL") or pretty good privacy ("PGP"). Each of the devices 900B-900G can be equipped with an operating system operable to support one or more computing applications or terminal sessions such as a web browser (not shown in FIG. 9), or other graphical user interface (not shown in FIG. 9), or a mobile desktop environment (not shown in FIG. 9) to gain access to the server computer 900A.

The server computer 900A can be communicatively coupled to other computing environments (not shown in FIG. 9) and receive data regarding a participating user's interactions/resource network. In an illustrative operation, a user (not shown in FIG. 9) may interact with a computing application running on a device 900B-900G to obtain desired data and/or perform other computing applications.

The data and/or computing applications may be stored on the server 900A, or servers 900A, and communicated to cooperating users through the devices 900B-900G over an exemplary communications network 820. A participating user (not shown in FIG. 9) may request access to specific data and applications housed in whole or in part on the server computer 900A. These data may be communicated between the devices 900B-900G and the server computer 900A for processing and storage.

The server computer 900A can host computing applications, processes and applets for the generation, authentication, encryption, and communication of data and applications, and may cooperate with other server computing environments (not shown in FIG. 9), third party service providers (not shown in FIG. 9), network attached storage ("NAS") and storage area networks ("SAN") to realize application/data transactions.

It should be appreciated that the computing architecture shown in FIG. 8 and the distributed network computing environment shown in FIG. 9 have been simplified for ease of discussion. It should also be appreciated that the computing architecture and the distributed computing network can include and utilize many more computing components, devices, software programs, networking devices, and other components not specifically described herein.

Example Clauses

The disclosure presented herein encompasses the subject matter set forth in the following clauses.

Clause 1. A computer implemented method, comprising: identifying communication data to analyze for sensitive data; evaluating the communication data to identify at least one data token included in the communication data, the at least one data token including a plurality of characters; converting each of the plurality of characters included in the at least one data token to a vector comprising vector values obtained from a character lookup table; generating a vector list including each vector representing each of the plurality of characters included in the at least one data token; and evaluating the vector list using a trained evaluation function to determine if the at least one data token comprises sensitive data, when the at least one data token comprises sensitive data, associating the communication data in a quarantine storage, when the at least one data token is devoid of sensitive data, allowing dissemination of the communication data.

Clause 2. The computer implemented method according to Clause 1, wherein the communication data is associated with an email, text message, or other electronic message and the evaluating is to determine if the at least one data token comprises password data.

Clause 3. The computer implemented method according to Clause 1, wherein trained evaluation function is based on a recursive machine learning model trained using a data set including known space delimited passwords and a data set including space delimited non-password characters.

Clause 4. The computer implemented method according to Clause 1, wherein the trained evaluation function is based on a recursive machine learning model trained using vectorized characters generated from the character lookup table.

Clause 5. The computer implemented method according to Clause 4, wherein the character lookup table comprises a plurality of characters, each character of the plurality of characters including a vector with associated values that represent one or more features or characteristics associated with the character.

Clause 6. The computer implemented method according to Clause 1, wherein the character lookup table comprises the plurality of characters, each character the plurality of characters including a vector with associated values that represent one or more features or characteristics associated with the character.

Clause 7. The computer implemented method according to Clause 1, wherein when the evaluating determines that the at least one data token comprises sensitive data, and prior to associating the communication data in a quarantine storage, evaluating a predetermined number of characters preceding and/or following the at least one data token to identify a context associated with the at least one data token, and determining the at least one data token comprises sensitive data when the context supports the determination that the at least one data token comprises sensitive data.

Clause 8. A computing device, comprising: a processor; a computer-readable storage medium in communication with the processor, the computer-readable storage medium having computer-executable instructions stored thereupon which, when executed by the processor, cause the processor to: receive an electronic message comprising a plurality of character sets, the character sets delimited by white space; convert each of the character sets of the plurality of character sets to a vector list to generate a plurality of vector lists, each vector list of the plurality of vector lists comprising a plurality of vectors each comprising vector values, the vector values obtained from a character lookup table, the character lookup table comprising characters that each include vector values that each represent at least one characteristic associated with a unique character; evaluate each vector list of the plurality of vector lists using a trained evaluation function to determine that at least one of the character sets includes password data; and cause a computer to generate and display a user interface including an indication that the electronic message comprises the password data.

Clause 9. The computing device according to Clause 8, wherein the electronic message is an email message or a text message.

Clause 10. The computing device according to Clause 8, wherein the computer-executable instructions, when executed by the processor, cause the processor to, subsequent to determining that at least one of the character sets includes password data, evaluate a predetermined number of characters preceding and/or following the character set including password data to identify a context associated with the character set including password data, and determine the character set includes the password data when the context supports the determination that the character set includes the password data using the trained evaluation function.

Clause 11. The computing device according to Clause 8, wherein trained evaluation function is based on a recursive machine learning model trained using a data set including known space delimited passwords and a data set including space delimited non-password characters.

Clause 12. The computing device according to Clause 8, wherein the trained evaluation function is based on a recursive machine learning model trained using vectorized characters generated from the character lookup table.

Clause 13. A computing device, comprising: a processor; a computer-readable storage medium in communication with the processor, the computer-readable storage medium having computer-executable instructions stored thereupon which, when executed by the processor, cause the processor to: identify communication data to analyze for one or more passwords; evaluate the communication data to identify at least one data token included in the communication data, the at least one data token including a plurality of characters; convert each of the plurality of characters included in the at least one data token to a vector comprising vector values obtained from a character lookup table; generate a vector list including each vector representing each of the plurality of characters included in the at least one data token; and evaluate the vector list using a trained evaluation function to determine if the at least one data token comprises a password, when the at least one data token comprises a password, inform a user that the communication data includes the password and prevent dissemination of the communication data, when the at least one data token is devoid of a password, allow dissemination of the communication data.

Clause 14. The computing device according to Clause 13, wherein the communication data is associated with an email, text message, or other electronic message.

Clause 15. The computing device according to Clause 13, wherein trained evaluation function is based on a recursive machine learning model trained using a data set including known space delimited passwords and a data set including space delimited non-password characters.

Clause 16. The computing device according to Clause 13, wherein the trained evaluation function is based on a recursive machine learning model trained using vectorized characters generated from the character lookup table.

Clause 17. The computing device according to Clause 16, wherein the character lookup table comprises a plurality of characters, each character of the plurality of characters including a vector with associated values that represent one or more characteristics associated with the character.

Clause 18. The computing device according to Clause 13, wherein the character lookup table comprises the plurality of characters, each character the plurality of characters including a vector with associated values that represent one or more characteristics associated with the character.

Clause 19. The computing device according to Clause 13, wherein the computer-executable instructions, when executed by the processor, cause the processor to: evaluate a predetermined number of characters preceding and/or following the at least one data token to identify a context associated with the at least one data token, and determine the at least one data token comprises the password when the context supports the determination that the at least one data token comprises the password.

Although the techniques have been described in language specific to structural features and/or methodological acts, it is to be understood that the appended claims are not necessarily limited to the features or acts described. Rather, the features and acts are described as example implementations of such techniques.

The techniques disclosed herein provide an enhanced level of security by identifying and suppressing the dissemination of sensitive data when it is found in electronic messaging. The techniques disclosed herein can provide a number of technical benefits over existing systems. For example, computing devices that employ the techniques disclosed herein have improved security compared to existing security techniques used by computing devices. Other technical benefits can also be realized from implementations of the technologies disclosed herein.

It should be appreciated that the above-described subject matter may be implemented as a computer-controlled apparatus, a computer process, a computing system, or as an article of manufacture such as a computer-readable storage medium. Among many other benefits, the techniques disclosed herein improve efficiencies with respect to a wide range of computing resources. For instance, human interaction with devices and systems may be improved as a result of the use of the techniques disclosed herein enable users and individuals to remotely manipulate rendered streams within a graphical environment associated with a communication session to better reflect their interactions in the communication session. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:
1. A computer implemented method, comprising:
   evaluating communication data to identify at least one data token included in the communication data, the at least one data token including a plurality of characters;
   converting each of the plurality of characters included in the at least one data token to a vector comprising vector values obtained from a character lookup table, wherein the character lookup table comprises a plurality of characters, each character of the plurality of characters having an associated vector comprising values that represent one or more characteristics associated with the character;
   generating a vector list in a vector list format, the vector list including each vector representing each of the plurality of characters included in the at least one data token; and
   evaluating the vector list using a machine learning model trained evaluation function to determine whether the at least one data token comprises sensitive data,
   responsive to determining that the at least one data token comprises the sensitive data, associating the communication data in a quarantine storage,
   responsive to determining that the at least one data token is devoid of the sensitive data, allowing dissemination of the communication data.

2. The computer implemented method according to claim 1, wherein the communication data is associated with an email, text message, or other electronic message and the evaluating is to determine if the at least one data token comprises password data.

3. The computer implemented method according to claim 1, wherein the trained evaluation function is based on a recursive machine learning model trained using a data set including known space delimited passwords and a data set including space delimited non-password characters.

4. The computer implemented method according to claim 1, wherein the trained evaluation function is based on a recursive machine learning model trained using vectorized characters generated from the character lookup table.

5. The computer implemented method according to claim 1, wherein the character lookup table comprises the plurality of characters, each character of the plurality of characters including a vector with associated values that represent one or more features or characteristics associated with the character.

6. The computer implemented method according to claim 1, wherein responsive to the evaluating determining that the at least one data token comprises the sensitive data, and prior to associating the communication data in a quarantine storage, evaluating a predetermined number of characters preceding and following the at least one data token to identify a context associated with the at least one data token, and determining the at least one data token comprises the sensitive data responsive to determining that the context supports the determination that the at least one data token comprises the sensitive data.

7. A computing device, comprising:
a hardware processor; and
a non-transitory computer-readable storage medium in communication with the processor, the computer-readable storage medium having computer-executable instructions stored thereupon which, when executed by the processor, cause the processor to:
receive an electronic message comprising a plurality of character sets, the character sets delimited by white space;
convert each of the character sets of the plurality of character sets to a vector list to generate a plurality of vector lists in a vector list format, each generated vector list of the plurality of vector lists comprising a plurality of vectors each comprising vector values, the vector values obtained from a character lookup table, the character lookup table comprising a plurality of characters, each character of the plurality of characters having an associated vector comprising values that represent one or more characteristics associated with the character;
evaluate each vector list of the plurality of vector lists using a machine learning model trained evaluation function to determine whether at least one of the character sets includes password data; and
responsive to determining that the at least one of the character sets includes the password data, cause a computer to generate and display a user interface including an indication that the electronic message comprises the password data.

8. The computing device according to claim 7, wherein the electronic message is an email message or a text message.

9. The computing device according to claim 7, wherein the computer-executable instructions, when executed by the processor, cause the processor to, subsequent to determining that at least one of the character sets includes the password data,
evaluate a predetermined number of characters preceding and following the character set including the password data to identify a context associated with the character set including the password data, and
determine the character set includes the password data responsive to determining that the context supports the determination that the character set includes the password data using the trained evaluation function.

10. The computing device according to claim 7, wherein the trained evaluation function is based on a recursive machine learning model trained using a data set including known space delimited passwords and a data set including space delimited non-password characters.

11. The computing device according to claim 7, wherein the trained evaluation function is based on a recursive machine learning model trained using vectorized characters generated from the character lookup table.

12. A computing device, comprising:
a hardware processor; and
a non-transitory computer-readable storage medium in communication with the processor, the computer-readable storage medium having computer executable instructions stored thereupon which, when executed by the processor, cause the processor to:
evaluate communication data to identify at least one data token included in the communication data, the at least one data token including a plurality of characters;
convert each of the plurality of characters included in the at least one data token to a vector comprising vector values obtained from a character lookup table, wherein the character lookup table comprises a plurality of characters, each character of the plurality of characters having an associated vector comprising values that represent one or more characteristics associated with the character;
generate a vector list in a vector list format, the vector list including each vector representing each of the plurality of characters included in the at least one data token; and
evaluate the vector list using a machine learning model trained evaluation function to determine whether the at least one data token comprises a password,
responsive to determining that the at least one data token comprises the password, inform a user that the communication data includes the password and prevent dissemination of the communication data,
responsive to determining that the at least one data token is devoid of the password, allow dissemination of the communication data.

13. The computing device according to claim 12, wherein the communication data is associated with an email, text message, or other electronic message.

14. The computing device according to claim 12, wherein the trained evaluation function is based on a recursive machine learning model trained using a data set including known space delimited passwords and a data set including space delimited non-password characters.

15. The computing device according to claim 12, wherein the trained evaluation function is based on a recursive machine learning model trained using vectorized characters generated from the character lookup table.

16. The computing device according to claim 12, wherein the computer-executable instructions, when executed by the processor, cause the processor to:

evaluate a predetermined number of characters preceding and following the at least one data token to identify a context associated with the at least one data token, and determine the at least one data token comprises the password when the context supports the determination that the at least one data token comprises the password.

\* \* \* \* \*